United States Patent [19]

Gowan et al.

[11] Patent Number: 4,628,580

[45] Date of Patent: Dec. 16, 1986

[54] METHOD FOR USING KITTING PARTS CAROUSEL SYSTEM

[75] Inventors: Norman H. Gowan, Los Angeles; Stasys Petravicius, Rancho Palos Verdes; Ignacio Hernandez, Gardena; Robert E. Kuhlmann, Torrance; Donald R. Vande Walle, Jr., Harbor City; Ronald P. Weddell, Huntington Beach; Joseph M. Gates, Gardena; Kenneth J. Sitzwohl, Torrance; Charles D. Sands, San Pedro; Rick A. Gwinn, Torrance; Milton J. Peterman, Los Angeles, all of Calif.

[73] Assignee: Hughes Aircraft Company, Los Angeles, Calif.

[21] Appl. No.: 765,884

[22] Filed: Aug. 14, 1985

Related U.S. Application Data

[62] Division of Ser. No. 468,822, Feb. 23, 1983, Pat. No. 4,549,664.

[51] Int. Cl.⁴ .................... B21D 39/00; B23P 11/00; B23Q 3/00; B23Q 7/00

[52] U.S. Cl. .................... 29/428; 29/434; 29/467; 29/559; 29/568

[58] Field of Search .................... 29/428, 430, 434, 467, 29/559, 568, 822; 206/503, 508, 509; 211/126, 129, 131, 163, 184, 194, 205; 312/97.1, 125, 308, 234

[56] References Cited

U.S. PATENT DOCUMENTS

| | | | |
|---|---|---|---|
| 1,642,771 | 9/1927 | Fullarton | 29/822 |
| 3,623,634 | 11/1971 | Norgard | 206/509 |
| 3,986,244 | 10/1976 | Latanzi | 312/234 X |
| 4,273,393 | 6/1981 | Foley et al. | 312/97.1 |
| 4,311,237 | 1/1982 | Hayes | 206/503 |

FOREIGN PATENT DOCUMENTS

| | | |
|---|---|---|
| 73749 | 8/1982 | European Pat. Off. . |
| 949640 | 9/1956 | Fed. Rep. of Germany . |
| 1922116 | 11/1970 | Fed. Rep. of Germany . |
| 2208013 | 8/1973 | Fed. Rep. of Germany . |
| 220889 | 8/1942 | Switzerland . |

*Primary Examiner*—Howard N. Goldberg
*Assistant Examiner*—R. S. Wallace
*Attorney, Agent, or Firm*—Leonard A. Alkov; A. W. Karambelas

[57] ABSTRACT

A method for using a carousel system is disclosed. The carousel bins are filled with selected parts in a stockroom, the carousels are stacked together such that each carousel closes the open top bins of the carousel therebelow, storing the group of carousels as work-in-process, moving the carousel system to an assembly station, separating the carousels at the assembly station to expose the parts in the bins, successively removing parts from the bins to produce assemblies; on completion of assemblies, to restack the carousels and return the carousel system to the stockroom for refilling. The carousel system is a plurality of carousels each having parts bins therein.

4 Claims, 7 Drawing Figures

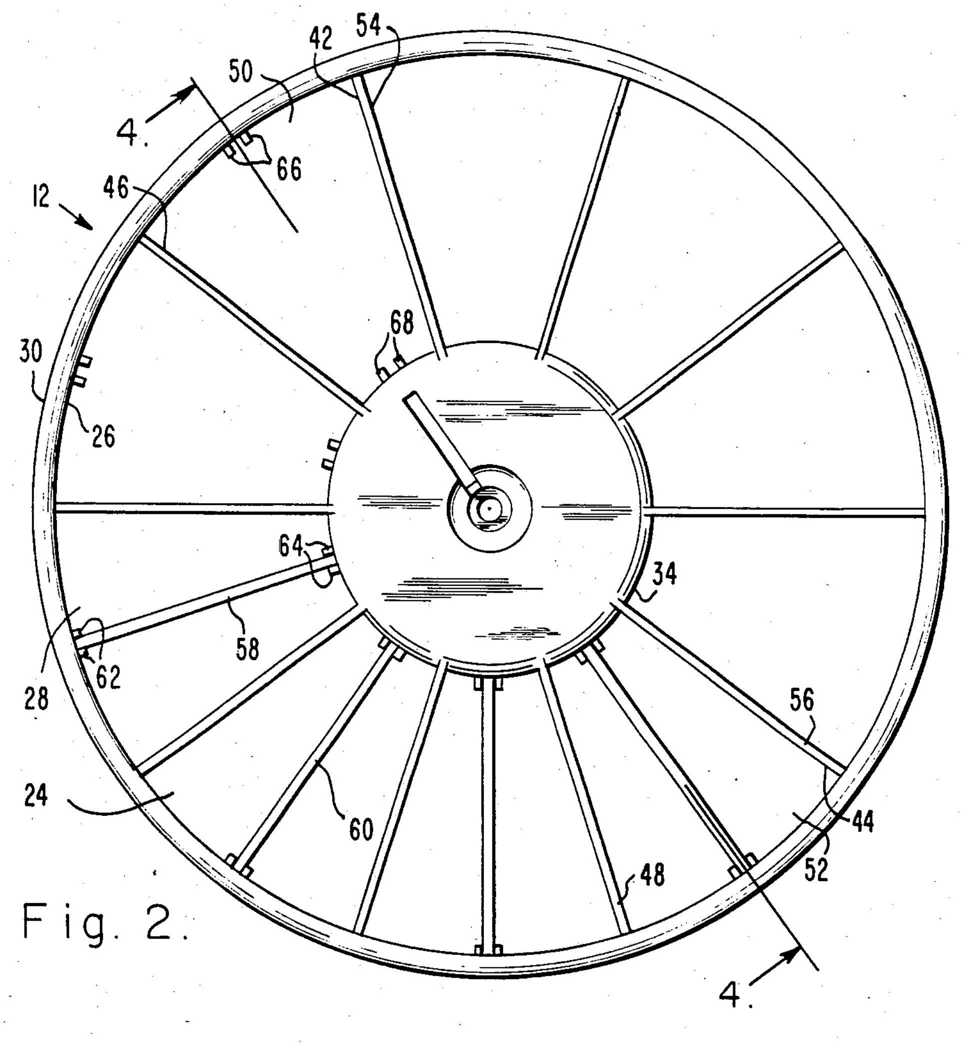
Fig. 2.
Fig. 7.
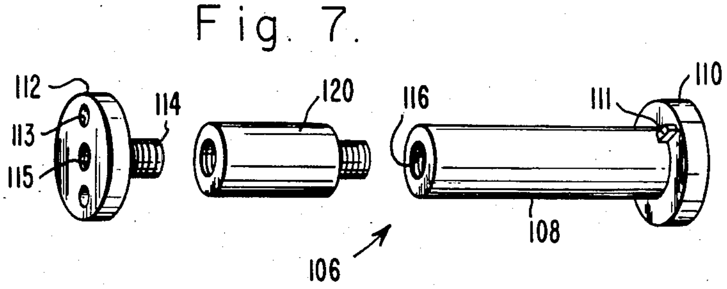

METHOD FOR USING KITTING PARTS CAROUSEL SYSTEM

TECHNICAL FIELD

The kitting parts carousel comprises a self supporting parts retaining rotary structure which is molded of static safe material. It is provided with secondary dividers, gravity feed parts bins, multicarousel nesting and a carousel cover for retention of parts until they are desired to be accessible for use.

BACKGROUND OF THE INVENTION

Many operations in modern manufacturing require the manual assembly of parts into a larger device. It has been conventional for a plurality of individual parts to be conveniently placed adjacent the assembler so that he can select parts and place them in the assembly. It has been traditional for an adequate number of parts to be placed in each bin, and when a bin became depleted, more of those individual parts were placed therein. In those cases where closely related assemblies were handled at the same assembly station, sometimes part bins having parts therein for different assemblies were positioned at the assembly station. The excess parts were unnecessary inventory, and sometimes were damaged by being handled in the bin over a period of time.

Another and indirectly related problem in electronic assembly is the possibility that an electronic part will be subjected to a static charge which will damage the electronic part. It is thus desirable to provide bins in a system in such a manner that the parts are protected from electrostatic discharge.

To solve these and other problems and satisfy the assembly needs, the kitting parts carousel system provides a way wherein a parts carousel can be loaded with parts for producing a specific number of assemblies, so that the minimum number of parts and minimum kinds of parts are presented to the assembler for producing a known number of assemblies. In this way, inventory is minimized, damages due to handling are minimized and parts control is more easily achieved.

SUMMARY OF THE INVENTION

In order to aid in the understanding of this invention it can be stated in essentially summary form that it is directed to a kitting parts carousel system wherein each carousel is injection molded preferably of static safe material and has dividers, gravity feed parts bins, multicarousel nesting and a carousel cover so that one or more carousels can be filled for providing the parts required to assemble a particular number of assemblies.

It is thus a purpose and advantage of this invention to provide a kitting parts carousel system which reduces material handling time by facilitating efficient collection and transfer of parts from a central storeroom to the individual assembly stations. It is a further purpose and advantage of this invention to provide a kitting parts carousel system where the carousels are arranged for nesting with each other to allow a plurality of the carousels to be stacked without requiring individual lids so as to provide a unit which contains all of the necessary parts for the assembly of a specific number of assemblies. It is another purpose and advantage of this invention to injection mold the kitting parts carousel of static safe material so as to allow safe handling of electrostatic sensitive components, with the injection molding eliminating the need for other structural suppport and yet provide more capacity in each bin. It is a further purpose and advantage of this invention to provide a kitting parts carousel wherein each bin has a sloping bottom to move the parts toward the operator as parts are depleted in the bin, and to permit the use of secondary dividers to subdivide the bins to provide a larger number of smaller bins which are useful with smaller components.

Further purposes and advantages of this invention will become apparent from a study of the following portion of the specification, the claims and the attached drawing.

BRIEF DESCRIPTION OF THE DRAWINGS

FIG. 2 is a plan view of one of the carousels.

FIG. 7 is a perspective view of the retention post for holding the carousels together in transit and in storage.

DETAILED DESCRIPTION OF THE INVENTION

Figure 1:
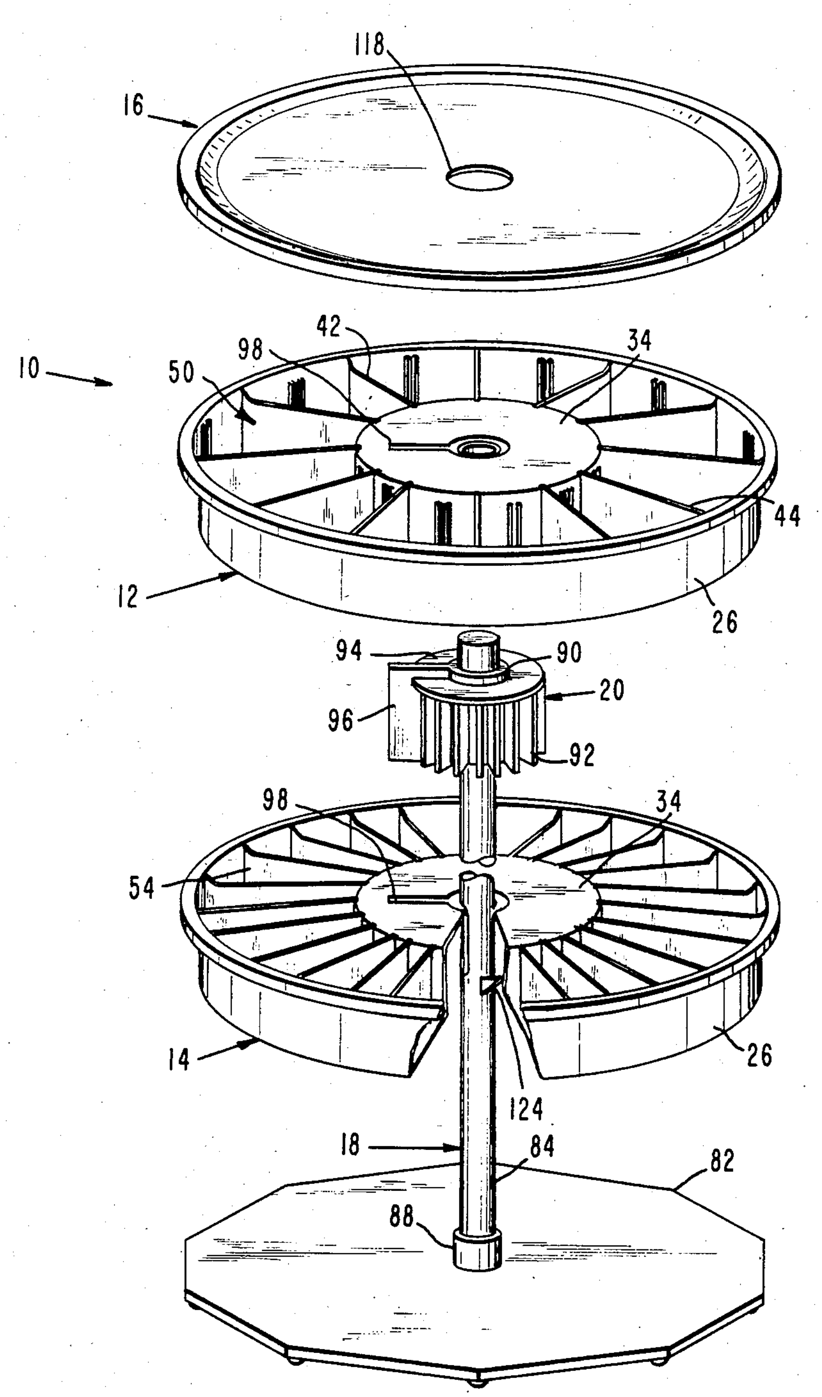
FIG. 1 is an exploded view of the kitting parts carousel system in accordance with this invention.

An embodiment of the kitting parts carousel system of this invention is generally indicated at 10, in FIG. 1. It is comprised of a plurality of carousels, two of which are shown are 12 and 14 with the carousels designed so that they can stack together with the top carousel closing the bottom carousel when they are closely positioned. The system includes a cover 16 which is shaped to cover a carousel and particularly the top carousel of a stack of carousels. When the system 10 is in use as a parts dispenser, the system includes suppport structure 18 and spacers 20. The system 10 is capable of receiving component parts from the stockroom organized in quantity and physical arrangement in accordance with the use thereof, to form an assembly loaded with parts which represent work in progress. Those parts can be stored in that organized manner until they are desired at the assembly point for building into the device. The use of static safe materials prevents damage due to static discharge at all handling pointw between the original stores and the final assembly.

Figure 4:
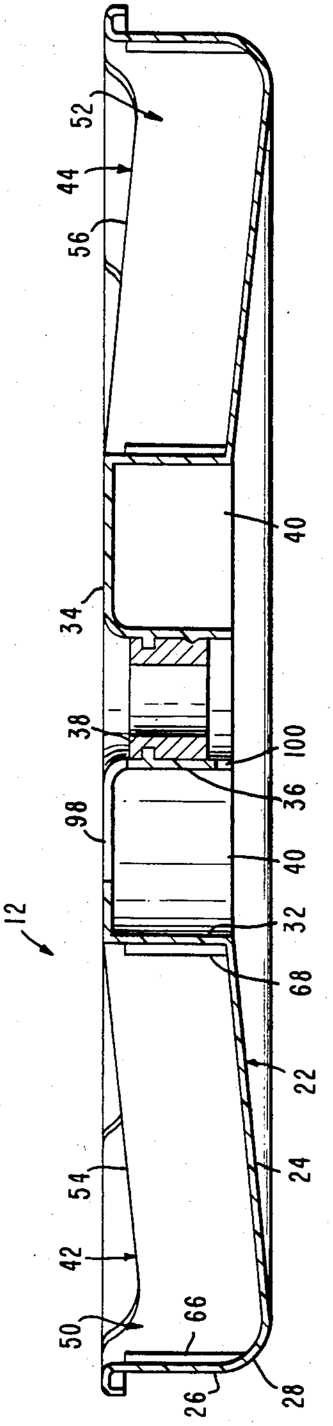
FIG. 4 is a sectional view through one of the carousels, as seen generally along the lines 4—4 of FIG. 2.
Figure 6:
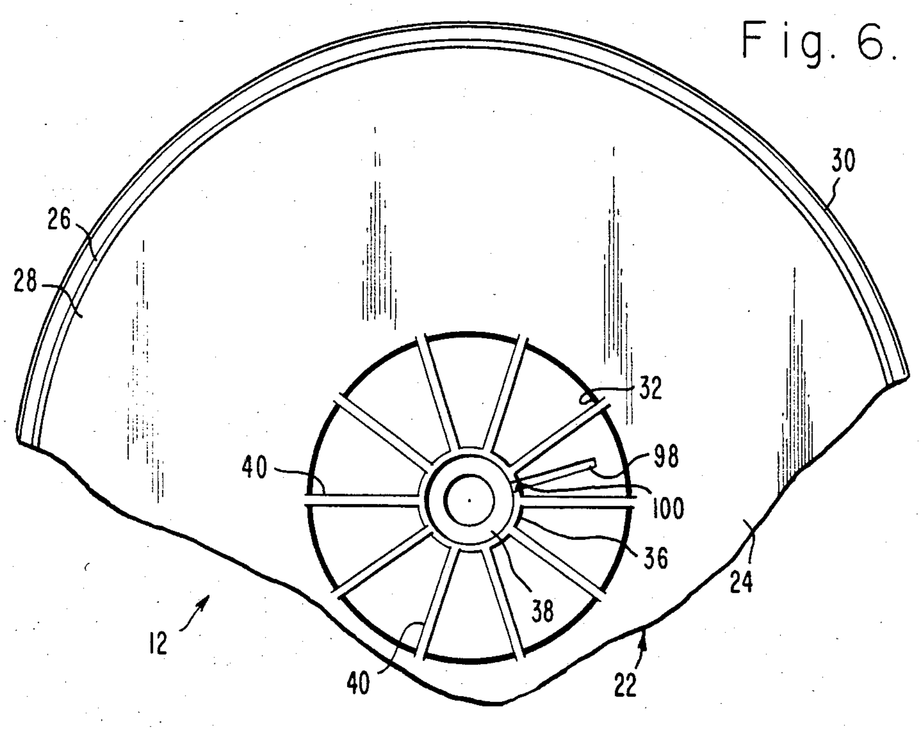
FIG. 6 is a bottom view of one of the carousels, with parts broken away.

Carousel 12 is shown in detail in FIGS. 2, 4 and 6. Carousel 12 is representative of a plurality of such carousels, each with identical structure. With such identical structure, and with appropriate design features, the carousel 12 can be injection molded with thermoplastic or thermosetting synthetic polymer composition material. The principle intended utility for the system 10 is in the handling of electronic parts and for this use it is important that the molding material be such as to be static safe and not subject parts in the lens to electrostatic potential. To provide static safe environment, the molding material may be a conductive protective material, a static dissipative protective material or an antistatic protective material These materials are all static safe and are electrically defined as follows: (1) conductive ESD protective materials are defined as materials having surface resistivities of $10^5$ ohms per square inch or less; (2) static dissipative materials are those materials having surface resistivities of $>10^5$ and $<10^9$ ohms per square inch; and (3) anti-static materials are those materials having surface resistivities of $\geqq 10^9$ and $\leqq 10^{14}$ ohms per square inch. Static safe materials bleed off electrostatic charges at a safe controlled rate, when properly grounded. The preferable discharge is dissipative by intrinsic ionic conductivity which is volumetric. This is an important quality that neutralizes static fields in the carousels of the system yet prevents spark generation which can occur with conductive materials. A preferred material to achieve the bleed off of electrostatic charges is "Astrostat", a registered trademark of Frick-Gallagher Mfg. Co., Wellston, Ohio 45692. This company provides it as a proprietary material. The proprietary electrostatic bleed-off material is compounded with a suitable thermoplastic or thermosetting resin to become an integral part of the resin itself. An electrochemical bond occurs between the antistatic compound and the resin itself and this bond reduces the volumetric conductivity of the resin. The result is a synthetic polymer composition material which is permanently static dissipative and is not dependent on moisture for conductivity. Suitable thermoplastic or thermosetting molding materials include polypropylene, polyvinylchloride, acrylic, polycarbonate, crystalline styrene, high and medium impact styrene, ABS and Noryl. Some thermosetting molding materials are also suitable. While static safe materials are preferred for the preferred utilization of this system, when the system is used where static safe conditions are not needed, ordinary materials of these types without the static safe additives can be used.

Referring to FIGS. 2, 4 and 6, the structure of carousel 12, and its companion carousels is described in detail. Carousel 12 has a unitary, one piece molded body 22 having a frustonconical bottom 24. On its outer edge, bottom 24 joins with outer wall 26 by curved junction 28. Curved junction 28 is the surface of a torus which is tangent to both bottom 24 and outer wall 26. Outer wall 26 is substantially cylindrical, with an outward taper along the upward extent of wall 26 equal to the thickness of wall 26. Rim 30 is formed on the top of wall 26 and is directed outwardly and downwardly to provide strength to the top of the rim and provide a locking point for cover 16. Smooth curves join the top of outer wall 26 to rim 30.

Inner wall 32 extends upwardly at the inner edge of frustonconical bottom 24. It is joined thereto by means of a smooth curve. At the top of inner wall 32 is radial flange 34 which extends inward to boss 36. Sleeve bearing 38 is molded in or pressed into boss 36 and may be secured therein by any convenient means such as a shoulder against which it is pressed in the upward direction. A press fit is satisfactory, particularly considering the draft in the interior of boss 36 which is provided for molding purposes. However, FIG. 4 shows a non-round feature useful in premanently installing the bearing in the molding operation. A plurality of webs 40 is integrally molded with inner wall 32, radial flange 34 and boss 36 to provide a light, moldable but substantially rigid structure. It is to be noted that sleeve bearing 38 is positioned short of both ends of boss 36 so that the boss provides a recess at each end shouldered by the bearing 38.

The compartment defined by bottom 24, outer wall 26 and inner wall 32 is divided into bins by means of bin walls. In FIGS. 2 and 4, bin walls 42 and 44 are particularly shown. In addition, bin walls 46 and 48, seen in FIG. 2, define bins 50 and 52. As seen in FIG. 2, there are ten fixed bin walls to define ten bins of equal angular size. The bin walls are directed toward the axis, on the centerline of sleeve bearing 38 and thus, are generally pie shaped configuration, truncated by inner wall 32. The top edges 54 and 56 of bin walls 42 and 44, and of all the other bin walls, lie equidistance from frustonconical bottom 24. Thus, the top edges 54 and 56 lie on a truncated frustonconical cone which is tangent to a partial toroidal surface which joins rim 30. The top of radial flange 34 lies on the same plane, normal to the axis, as rim 30. The configuration of the top of one carousel, including the top flange, the rim and the top of the bin walls is identical to the bottom so that when one carousel is laid on the next, the bottom of the top carousel lies against the top of the lower carousel to completely enclose the bins in the lower carousel. It is for this reason that the outer wall 26 is drafted upwardly and outwardly equal to its thickness so that the bottom outside curve of junction 28 of the upper carousel fits within and against the curve of the bin wall 54 to form a closed joint therebetween. What this means is that the height of the molding at any lateral point across the carousel 12 is the same as the height at any other point (except rim 30 which is outside the closure). The plane of the radial flange 42, the frustonconical surface of bottom 24 and the portion of toroidal curve junction 28 each have their counterpart at the top and bottom of the carousel 12. The downward and outward sloping of the bottoms of the bins gravitationally feeds outward the parts in the bins for easy accessibility.

The permanently molded in fixed bin walls of which bin wall 42, 44, 46 and 48 are examples, divide the carousel into ten bins. In addition, guide flanges are positioned in those bins for the optional insertion and removal of temporary bin walls. For example, removable bin walls 58 and 60 are shown as inserted between appropriate guide flanges on the inside of outer wall 26 and on the outside of inner wall 32. In FIG. 2, a pair of flanges 62 as shown as embracing the outer edge of removable bin wall 58 and a pair of flanges 64 as shown as embracing the inner end of removable bin wall 58. The embrace by the flanges on the removable bin wall is such as to frictionally retain the bin wall in place, but permit manual removal and reinsertion of the removable bin wall 58. Another of such pairs of flanges are shown at 66 and 68 in FIG. 4, with those pairs of flanges also shown in FIG. 2. Preferably, such pairs of flanges are positioned in each one of the bins so that the insertion of ten removable bin walls divides the carousel into twenty bins. The removable bin walls have the same shape at the bottom to lie against the top of bottom 24, including its curved junction 28. The removable bin walls also have a top edge which corresponds to the top edge 54 to lie in line therewith so as to form a bin wall closure with the bottom of the next above stacked carousel when such an upper carousel is in position.

Figure 5:
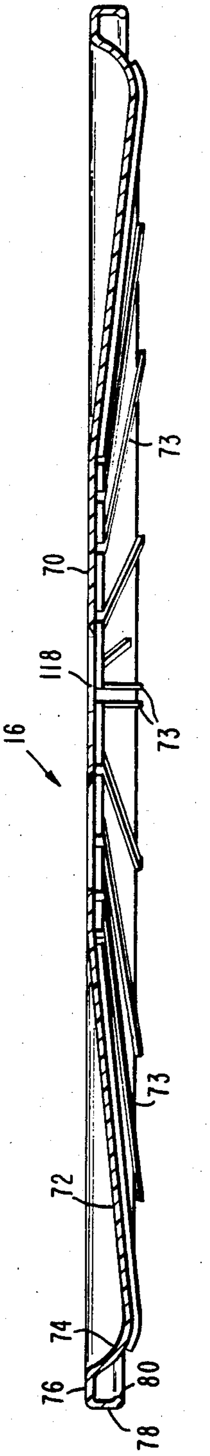
FIG. 5 is a centerline section through a carousel cover.

Cover 16 as shown in cross-sectional detail in FIG. 5. Cover 16 is also injection molded and has the features thereon which permitted to closely adjoin the top of the carousels, to close the carousels. Cover 16 thus has central plate 70 which forms the center portion of the cover. Central plate 70 is planar in configuartion and the same diameter as radial flange 34. Outwardly from central plate 70 as frustonconical section 72 which corresponds to the frustonconical top edge 54. Downwardly extending pairs of ribs 73 formed on the bottom of the cover embrace the bin walls to close each bin. Outwardly from section 72 is curved section 74 which is the same configuration as curved junction 28. Outwardly, from curve section 74 is lip 76 which overlies rim 30 and detent section 78 which is configured to lie down around rim 30. Tooth 80 represents plurality of teeth around the lower inner edge of detent section 78, or one continuous tooth. Once cover 16 is put in place on top of the carousel, such as carousel 12, central plate lies on top of flange 34, section 72 lies on top of the frustonconical portion of the bin walls, ribs 73 embrace the tops of the bin wall, curved section 74 lies against the curved section of the bin walls, and detent section engages over rim 30 with tooth 80 resiliently engaging under the lip. The resilient engagement of the tooth holds cover 16 in place, but manual release of tooth 80 can be effected for removal of the cover.

FIG. 1 shows support structure 18 which comprises base 82 which is suitable for support in any convenient, conventional manner. Post 84 extends upward out of base 82, to be supported thereby. Other suitable support for post 84 includes insertion of the post in a socket on the worktable 86, see FIG. 3, a clamp attached to the bottom of the post 84 for clamping on the edge of the workstation or a smaller base 82 which has attachment points by which it may be screwed down to the top of the worktable. Post 84 is a vertically upstanding post of a suitable diameter so that sleeve bearing 38 may rotate thereon. Stop 88 at the base of post 84 is sufficiently high to engage the bottom of bearing 38 and hold the bottom of carousel 14 off of base 82. Stop 88 is sufficiently small to fit within boss 36 without contact so that the vertical support of carousel 14 is with the bottom of bearing 38 engaging on the top of stop 88. Lateral support is provided by bearing 38 engaging around post 84.

In order to space carousel 12 above carousel 14 so that the bins in carousel 14 are accessible, spacer 20 is provided. Spacer 20 is a central sleeve 90 which at its top engages within boss 36 below bearing 38 in carousel 12 and at its bottom engages within the boss 36 and above bearing 38 in carousel 14. This provides axial alignment of the two carousels. Sleeve 90 has a bore therethrough which rotatably receives shaft 84. The spacing between the carousels is provided by webs 92 which are formed radially outward on sleeve 90. The tops of the webs 92 are joined by disc 94. When in the spacing position, the lower ends of the webs 92 engage against the radial flange 34 of carousel 14 and the disc 94 engages against the webs 40 on the bottom of carousel 12. In order that the two carousels rotate together, key 96 is provided on spacer 20. Key 96 on its bottom extends past webs 92 and engages in key slot 98 in flange 34 of carousel 14. The upper edge of key 96 engages in key slot 100, see FIG. 4, in the lower edge of boss 36, which extends between webs 40, see also FIG. 6. The key slots 98 and 100 are in the same radial plane so that when spacer 20 is engaged in the key slots both top and bottom the two carousels are at the same angular orientation around post 84. Where the parts and bins in two different carousels are angularly oriented with respect to each other in a known manner so as to aid in assembly, the keying together of the two bins is helpful in assembly reliability and time reduction.

Figure 3:
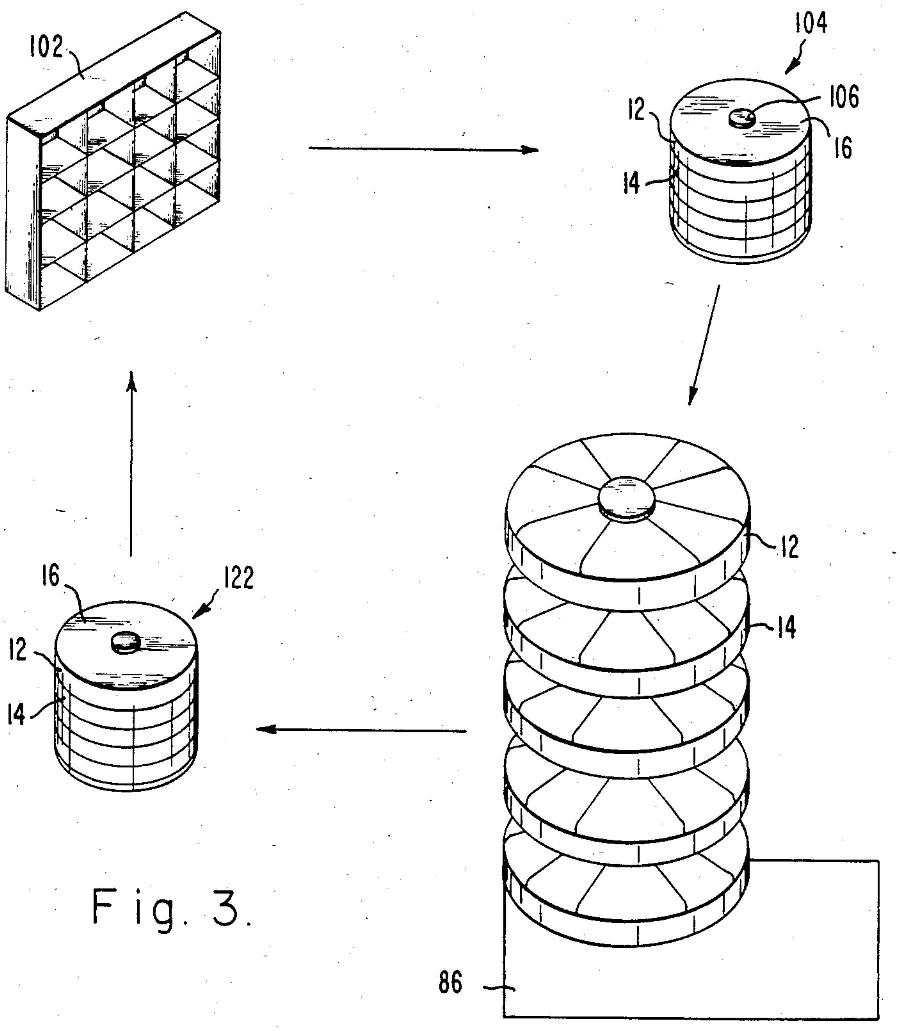
FIG. 3 is a schematic diagram showing the manner in which the carousel system moves the desired parts and protects them from central storage to the assembly work station.

FIG. 3 schematically illustrates the manner in which the carousels are used. They are taken to the location where the component parts are kept in a stockroom 102. The stockclerk fills the bins in the carousel each with a particular quantity of a particular part to produce a particular number of finished assemblies. Preferably, the exact count of parts is supplied, in order to control inventory and reduce the possiblity of error. In some cases, a few extra parts may be supplied in one or more of the bins. Each bin is identified by a label on the outside of wall 26 for accuracy in loading and parts removal during assembly operations. When a group of carousels is loaded, preferably with the number and kinds of parts to produce a particular quantity of a particular assembly, the loaded carousels are stacked and represent work in progress, ready for assembly. As previously described, one carousel nests on top of the one below to completely close the bins, to prevent loss of parts and prevent contamination of the parts. Since the material of which the carousels are made is static safe, those electronic parts which are sensitive to static discharge are protected. Cover 16 is put in place on the top carousel. As previously decribed, cover 16 is retained on the top carousel by engagement of tooth 80. Thus, when only one carousel is involved, it is fully protected.

However, when there are two or more filled parts carousels in the paticular assembly group 104 of loaded carousels, see FIG. 3, they may be retained together by means of the retention post 106 shown on FIG. 7. Retention post 106 comprises stem 108 of such diameter to fit through the two sleeve bearings 38 in the two carousels. Head 110 engages engages in the recess interiorly of boss 36 and below bearing 38 in the bottom of the lower carousel with its key 111 in key slot 100. Cap screw 112 has its head engaged around the opening 118, in cover 16 on the top of the upper carousel. Screw 114 engages in threaded hole 116 in stem 106 to hold the two carousels together. Recesses 113 in cap 112 permit manual insertion and removal. The length of stem 108 is sufficient to hold two carousels together in the manner described, and the head 110 and cap 112 are out of the way so several such assemblies can be stacked. If three carousels are to be clamped together in the manner described, extensions 120 can be employed. Extension stem 120 is the height of the third carousel and is provided with features so that it can screw into opening 116 and receive screw 114 so that the enhanced stem is now sufficiently long to clamp together three such carousels. As many extension stems 120 can be employed as required. Threaded hole 115 is also provided in cap 112 so a handle or conveyer hook can be threaded therein for handing of the goоup 104 of carousels. In this way, the group of carousels 104 provides security for the parts because the carousels cannot be inadvertantly opened.

When the carousels are brought to the work station with its workstation 86, the carousels may be employed in either of two ways. In the first way, as previously described, the retention post 106 and cover 16 are removed. The lowest carousel is placed on post 84, and its spacer 20 is installed. Then the next higher carousel is put in place, followed by another spacer 20. This is repeated until all of the carousels for the particular assembly operation are installed on post 84. The spacers 20 key the carousels together so that they are always oriented in the same angular position with respect to each other so that during the assembly operation the relative position of the parts bins is known to the assembler. When the assembly operation is complete, the carousels are again stacked as indicated by the group 122 of stacked empty carousels. In the return of the empty carousels to component parts supply 102, they need not be held together by the retention post of FIG. 7. However, where parts are left over from the assembly, retention together is desirable to protect those parts so that they may be used again.

The other manner of utilization of the carousels comprises placing the entire stack of carousels, stacked together, on post 84. Removal of cover 16 exposes the bins in the top carousel 12. Those parts are employed in the assembly and when they are utilized, the top, now unneeded carousel is raised on post 84. Finger 124, see FIG. 1, is pivoted in the side of post 84. It is pivoted into the post when the carousels are first placed on the post 84, and when the upper carousel 12 is raised after its utilization is completed, the finger 124 is swung out of the post. It thus supports the first used carousel 12 above the next carousel 14 so that access to the bins of the second carousel 14 is achieved. Thereupon, assembly continues with the employment of parts in the second carousel, and when the second carousel 14 is no longer needed, it too is raised above finger 124 and retained thereby. The height of finger 124 above base 82 controls the number of carousels which can be handled in this way, to permit adequate access to the second carousel when the first one is raised on the finger. This manner of utilization of the carousels does not require the spacers 20, but permits access to only one carousel at a time which is disadvantageous when access to more than one carousel is helpful.

This invention has been described in its presently contemplated best mode and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. The method of handling parts, comprising the steps of:

providing a plurality of injection molded synthetic polymer composition material carousels, each having a body having a bottom which is frustoconical about an axis and which slopes downwardly in the radially outward direction, a curved junction portion contiguous with said bottom, said curved junction being a portion of a toroid about said axis, said body having an outer wall which is a geometric surface about said axis, said outer wall being contiguous with said curved junction, an inner wall contiguous with said bottom, said inner wall having a surface which is substantially cylindrical about said axis and a plurality of bin walls permanently molded within said body, said bin walls being substantially radial and each lying in a plane substantially passing through said axis, said bin walls adjoining said bottom, said curved junction, said outer wall and said inner wall and being formed therewith to form bins therebetween, said bin walls being of substantially constant height above said bottom whereby the downward slope of the tops of said bin walls matches the slope of the bottom of another said body which can rest upon the tops of said bin walls and completley close said bins;

filling selected bins with selected parts in predetermined quantity so as to supply a substantial number of parts for assembly into a predetermined number of assemblies, said substantial number of parts for said predetermined assemblies being placed in the bins of a plurality of said carousels;

stacking said carousels together so that each carousel closes the open top bins of the carousel therebelow and placing a cover over the top carousel, and with the carousels in the stacked position, storing the group of carousels as work-in-process and with the carousels in stacked position moving the parts to an assembly station;

separating the carousels at the assembly station so that at least one of the carousels has its bins exposed and successively removing parts from the bins to produce the predetermined number of assemblies; and on completion of those assemblies, restacking the carousels and placing the cover on the top carousel thereof and returing the carousels to the filling point where they may be refilled.

2. The method of claim 1 further including the preliminary step of injection molding the carousels with static safe material.

3. The method of claim 1 further including the step of securing together the stack of carousels having parts in their bins so that each bin is secured closed by the next above carousel.

4. The method of claim 1 further including the step of placing the carousels on an upright post with a spacer between each of the carousels so that the bins in each of the carousels are accessible.

* * * * *